C. OVERGAARD.
MANUFACTURE OF CRANK SHAFTS AND THE LIKE.
APPLICATION FILED DEC. 16, 1911.
1,100,842.
Patented June 23, 1914.
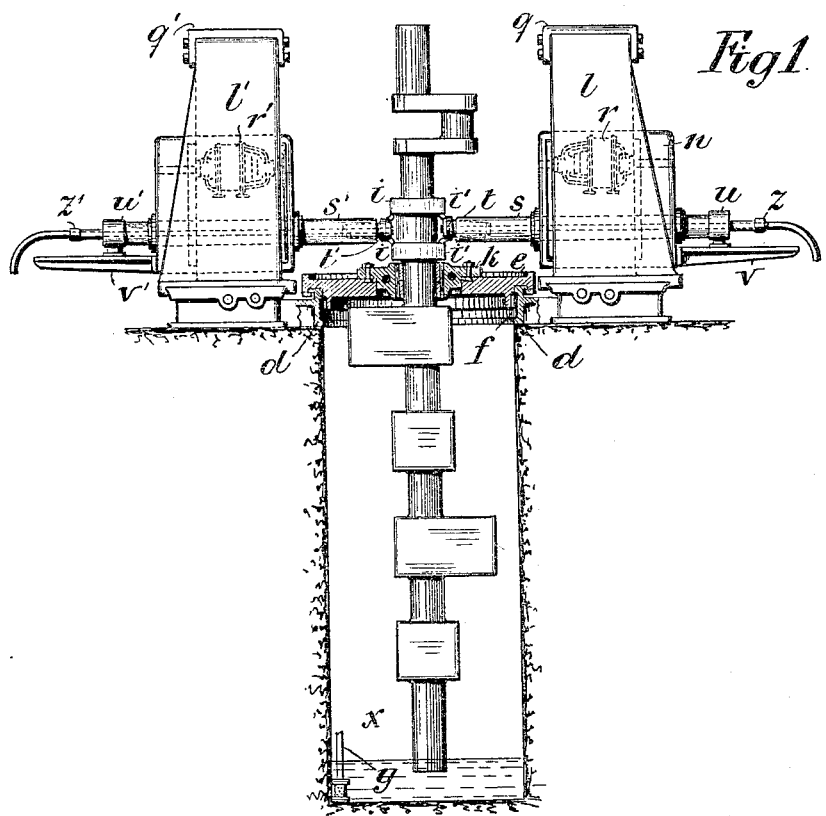
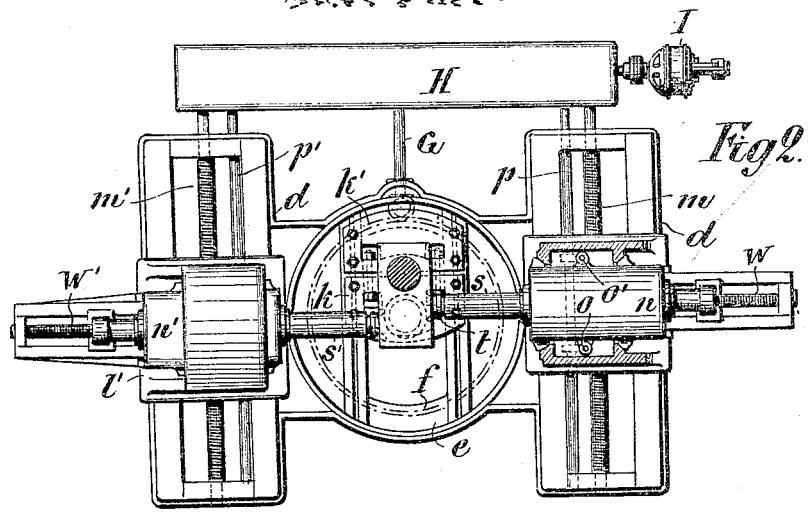
WITNESSES
INVENTOR
CHRISTEN OVERGAARD
Attorney

UNITED STATES PATENT OFFICE.

CHRISTEN OVERGAARD, OF COPENHAGEN, DENMARK.

MANUFACTURE OF CRANK-SHAFTS AND THE LIKE.

1,100,842. Specification of Letters Patent. Patented June 23, 1914.

Application filed December 16, 1911. Serial No. 666,280.

*To all whom it may concern:*

Be it known that I, CHRISTEN OVERGAARD, engineer, a subject of the Kingdom of Denmark, residing at No. 4 Amager Boulevard, Copenhagen, Denmark, have invented certain new and useful Improvements in and Relating to the Manufacture of Crank-Shafts and the like; and I do hereby declare the following to be a full, clear, and exact description of the invention, such as will enable others skilled in the art to which it appertains to make and use the same.

The object of my invention is a method of milling crank shafts or the like, by which it is possible in a rational manner to produce crank shafts, which possess the great accuracy necessary in the motor-industry, and which are without the defects incident to the crank shafts produced according to the methods hitherto used.

According to methods hitherto used the crank shaft has either been treated in an ordinary lathe or in special machines, in which the shaft either was horizontally supported in two or more clamps or vertically supported in a single clamp. However it is impossible in an ordinary lathe to manufacture an accurate crank shaft because the great horizontal strains produced in the shaft by its fixing in the lathe, the great balancing counterweights necessary and the weight of the shaft itself prevent accurate work, as the power moment of resistance against bending of a crank horizontally placed varies much in its different positions during a revolution. Of course the bending of the crank during each revolution will vary in accordance with the instantaneous moment of resistance and consequently the turned crank pin can never be round. Further the lathe demands long tools and a shifting of tools for each cut which shall be removed from the crank-pin, as it is necessary beginning in the middle of the pin to treat first one half of it by one tool, and then to insert a new tool, and again beginning in the middle of the pin to treat the other half of the pin with said tool, which of course helps to do the work inaccurately.

It is impossible in machines, in which the cylindrical parts of the crank shaft are horizontally supported in clamps to produce a sufficiently accurate crank, nor in such machines is it possible to prevent variations caused by the bending of the crank, and as the fixing of the shaft at more points will produce strains in the shaft, full accuracy will be unattainable.

The detrimental influences of the supports and the weight of the shaft are omitted in machines in which the shaft is supported vertically at one point alone, but in such machines it has been impossible to produce a sufficiently accurate crank shaft. For in such machines the shaft is treated with a tool which will produce bending impulses because the cutting power transmitted through the crank shaft, acts horizontally; that is, perpendicularly to the longitudinal direction of the shaft, or in the same manner as the weight of the shaft itself when the shaft is horizontally supported. As now the shaft is supported only at a single point, it will be clear that, during the rotation, the shaft will be subjected to so great vibrations that an accurate treatment is impossible even if the work is done with very fine cuts and at small velocity. Even if the tool was replaced by a milling cutter it would be impossible to finish a cylindrical crank pin, because the crank shaft during the milling would be caused to vibrate so much that the work could not be accurate. All said disadvantages are removed by the improved method which forms object of the present invention, in which the crank shaft in the well known manner is supported vertically at a single point in a horizontally rotatory clamping table, so that neither by the supports nor by the weight of the shaft itself moments can be introduced which have a detrimental influence upon the accuracy of the work.

The characteristic feature of the new method is that during the treatment of the crank shaft so supported no moments are introduced which can have a detrimental influence upon the accuracy of the work. This result is obtained by reason of the fact that the shaft is treated by means of end milling cutters the speed of which is varied in such a manner that the vibratile impulses produced by each of said end milling cutters counteract each other. Said end milling cutters are adapted to be displaced in relation to each other, and independently of each other to be moved toward, transversely to and parallel to the shaft from different sides. By these means vibrations of the shaft during the milling are prevented, and consequently every source of inaccuracy is eliminated.

The improved method may be carried into effect by means of the machine described in my copending application No. 666,279, filed Dec. 16, 1911, which machine is illustrated in the accompanying drawing, in which Figure 1 shows a front view of the machine partially in vertical section, and Fig. 2 a plan of the machine.

On the bedplate $d$ is placed a revoluble table $e$ provided with a rack $f$ which with the shaft G and intermediate gearing can be caused to rotate the table; the different gearing necessary to give the table various speeds being placed inside the box H and the motive power being derived from the motor I. Upon the table $e$ is placed a pair of clamp elements $k$, $k^1$, which hold the crank shaft, and are tightened by bolts or the like. The clamps can move diametrically over the whole of the table in such a way that the crank shaft can be rotated bodily about a center which is the center of the table, and at any radial distance therefrom desired. It is of course also possible to rotate the crank shaft, while the same is concentric with the center of the revoluble table. The bedplate is, on both sides of the table provided with guides, and upon each of these are placed housings $l$, $l^1$, which by the aid of traveling screws $m$, $m^1$, can be moved backward and forward upon the guides by means of the gear in the gear box H. In the housings $l$, $l^1$, are placed slides $n$, $n^1$, which move vertically between four guides, whereby accuracy and rigid guidance is insured. The vertical motion can be produced by two screws $o$, $o^1$, which co-act with nuts upon the slides. The screws are driven by shafts $p$, $p^1$, which can also be rotated at different directions from the gear box H.

The housings $l$, $l^1$, are strengthened at their top by means of cross-pieces, $q$, $q^1$. In the slides $n$, $n^1$, motors $r$, $r^1$, are placed, which are by different gearing connected with the spindles $s$, $s^1$, which carry the end milling cutters $t$, $t^1$, thereby allowing, that the speed of said cutters may be regulated independently of one another. On the other end of the cutter spindles are crossheads $u$, $u^1$, which at the same time form thrust bearings for the spindles. The crossheads slide on the guides $v$, $v^1$, and the spindles can travel out and in by aid of the guide screws $w$, $w^1$. To enable the crank shaft to be vertically supported, there is provided beneath the table $e$ a pit $x$, which also serves as a reservoir for the soap water or other lubricant, used during the milling, from the pit the soap water is pumped up through the pipe $y$ by a pump and is led through flexible tubes $z$, $z^1$ to the hollow spindles $s$, $s^1$, and thence through the cutters $t$, $t^1$, which it leaves just in front of each cutting edge.

By means of such a machine it will be evident that the shaft can be treated according to my improved process, as in said machine the two end milling cutters can rotate at different speeds and be displaced in relation to each other and from different sides independent of each other can be moved toward, transversely to and parallel to the shaft, all in such a manner that vibrations of the shaft during the milling are prevented, and that consequently every source of inaccuracy is eliminated.

Having now fully described my invention, I declare, that what I claim is:

The herein described method of milling crank shafts or the like, said method consisting in vertically supporting the blank at a single point and moving it around a vertical axis, during which movement the excess of metal is milled away by end milling cutters the speeds of which are adjusted relatively to each other in such a manner that vibrations of the blank are prevented; substantially as specified.

In testimony whereof, I affix my signature, in presence of two witnesses.

CHRISTEN OVERGAARD.

Witnesses:
MARCUS LOELLER,
CHAS. HORTENSE.

---

Copies of this patent may be obtained for five cents each, by addressing the "Commissioner of Patents, Washington, D. C."